United States Patent [19]

Kingston

[11] Patent Number: 5,693,157
[45] Date of Patent: Dec. 2, 1997

[54] METHOD OF PREPARING BETA TITANIUM-FIBER REINFORCED COMPOSITE LAMINATES

[75] Inventor: William R. Kingston, Chino Hills, Calif.

[73] Assignee: Ticomp, Inc., Chino, Calif.

[21] Appl. No.: 690,801

[22] Filed: Aug. 1, 1996

Related U.S. Application Data

[60] Division of Ser. No. 588,868, Jan. 19, 1996, Pat. No. 5,578,384, which is a continuation-in-part of Ser. No. 568,530, Dec. 7, 1995, which is a continuation of Ser. No. 139,091, Oct. 18, 1993, abandoned.

[51] Int. Cl.⁶ .................... C23C 16/00; C23C 28/02
[52] U.S. Cl. .................... 148/537; 148/518; 148/527; 427/388.1; 427/371.8; 156/153; 156/281; 156/330
[58] Field of Search .................... 148/421, 516, 148/518, 537, 670, 527; 428/608, 622, 634, 635, 457, 614, 626, 660, 670, 668; 427/388.1, 376.8; 156/153, 281, 330

[56] References Cited

U.S. PATENT DOCUMENTS

| | | |
|---|---|---|
| 3,758,234 | 9/1973 | Goodwin . |
| 3,888,661 | 6/1975 | Levitt et al. . |
| 3,936,277 | 2/1976 | Jakway et al. . |
| 3,991,928 | 11/1976 | Friedrich et al. . |
| 4,029,838 | 6/1977 | Chamis et al. . |
| 4,115,611 | 9/1978 | Stoltze et al. . |
| 4,132,828 | 1/1979 | Nakamura et al. . |
| 4,137,370 | 1/1979 | Fujishiro et al. ............ 428/660 |
| 4,141,802 | 2/1979 | Duparque et al. . |
| 4,356,678 | 11/1982 | Andrews et al. . |
| 4,411,380 | 10/1983 | McWithey et al. . |
| 4,473,446 | 9/1984 | Locke et al. . |
| 4,489,123 | 12/1984 | Schijve et al. ............ 428/213 |
| 4,500,589 | 2/1985 | Schijve et al. ............ 428/213 |
| 4,624,897 | 11/1986 | Ito ............ 428/432 |
| 4,753,850 | 6/1988 | Ibe et al. . |
| 4,775,602 | 10/1988 | Rasch ............ 428/668 |
| 4,777,098 | 10/1988 | Takamura et al. ............ 428/664 |
| 4,816,347 | 3/1989 | Rosenthal et al. ............ 428/615 |
| 4,917,968 | 4/1990 | Tuffias et al. ............ 428/621 |
| 4,935,291 | 6/1990 | Gunnink ............ 428/213 |
| 4,956,026 | 9/1990 | Bell ............ 148/127 |
| 4,992,323 | 2/1991 | Vogelesang et al. ............ 428/215 |
| 5,006,419 | 4/1991 | Grunke et al. ............ 428/623 |
| 5,008,157 | 4/1991 | Paxos ............ 428/612 |
| 5,009,966 | 4/1991 | Garg et al. ............ 428/627 |

(List continued on next page.)

OTHER PUBLICATIONS

NASA CR-1859, "Analytical and Experimental Investigation of Aircraft Metal Structures Reinforced with Filamentary Composites—Phase I—Concept Development and Feasibility," S. Oken and R.R. June, 129 pp. (1969–1970).

NASA CR-2039, "Analytical and Experimental Investigation of Aircraft Metal Structures Reinforced with Filamentary Composites—Phase II—Structural Fatigue, Thermal Cycling Creep, and Residual Strength," B. Blichfeldt and J.E. McCarty, 111 pp. (1969–1970).

*Primary Examiner*—John Sheehan
*Attorney, Agent, or Firm*—David A. Farah, M.D.; Sheldon & Mak

[57] ABSTRACT

A method of preparing a beta titanium-fiber reinforced composite laminate comprising the steps of, first, providing a beta titanium alloy having a first yield strength to modulus of elasticity ratio; then, heating the beta titanium alloy at a first preselected temperature for a first preselected time to produce a beta titanium alloy having a second yield strength to modulus of elasticity ratio; and then, adhering a fiber reinforced composite having a strength to modulus of elasticity ratio to the beta titanium alloy to produce a beta titanium-fiber reinforced composite laminate; wherein the first preselected temperature and the first preselected time are preselected such that the second yield strength to modulus of elasticity ratio of the beta titanium alloy is substantially similar to the strength to modulus of elasticity ratio of the fiber reinforced composite.

17 Claims, 3 Drawing Sheets

U.S. PATENT DOCUMENTS

| | | | |
|---|---|---|---|
| 5,039,571 | 8/1991 | Vogelesang et al. | 428/213 |
| 5,076,875 | 12/1991 | Padden | 156/313 |
| 5,079,101 | 1/1992 | Murayama | 428/623 |
| 5,100,737 | 3/1992 | Colombier et al. | 428/612 |
| 5,104,460 | 4/1992 | Smith, Jr. et al. | 148/11.5 F |
| 5,122,422 | 6/1992 | Rodhammer et al. | 428/634 |
| 5,160,771 | 11/1992 | Lambing et al. | 428/57 |
| 5,200,004 | 4/1993 | Verhoeven et al. | 148/527 |
| 5,213,904 | 5/1993 | Banker | 428/651 |
| 5,215,832 | 6/1993 | Hughes et al. | 428/623 |
| 5,232,525 | 8/1993 | Smith et al. | 148/514 |
| 5,242,759 | 9/1993 | Hall | 428/610 |
| 5,260,137 | 11/1993 | Rosenthal et al. | |
| 5,403,411 | 4/1995 | Smith et al. | 148/514 |
| 5,429,877 | 7/1995 | Eylon | 428/586 |
| 5,460,774 | 10/1995 | Bachelet | 419/5 |

METHOD OF PREPARING BETA TITANIUM-FIBER REINFORCED COMPOSITE LAMINATES

CROSS-REFERENCE TO RELATED APPLICATION

This Application is a divisional of U.S. patent application Ser. No. 08/588,868 filed Jan. 19, 1996, entitled BETA TITANIUM-REINFORCED COMPOSITE LAMINATES, now U.S. Pat. No. 5,578,384, issued Nov. 26, 1996, which is a continuation-in-part of U.S. patent application Ser. No. 08/568,530 fled Dec. 7, 1995, entitled CARBON-TITANIUM COMPOSITES, which is a continuation of U.S. patent application Seri. No. 08/139,091, entitled TITANIUM AND GRAPHITE FIBER COMPOSITES, filed Oct. 18, 1993, now abandoned, the contents of which are incorporated herein by reference in their entirety.

BACKGROUND

Many industrial applications require materials that possess a combination of high strength, low weight and damage resistance. In order to meet these needs, both metals and metal-composite laminate materials are utilized.

One application for materials possessing high strength, low weight and damage resistance are for the construction of parts for motor and human powered vehicles in order to provide satisfactory structural integrity and damage resistance, while increasing the range of the vehicle for a given amount of fuel or power. Such vehicles include automobiles, trucks, planes, trains, bicycles, motorcycles, and spacecraft. Other applications include golf clubs (both the shaft and the head), tubular structures such as softball bats, skis, and surf and snow boards.

In order to meet the needs of the aerospace industry, for example, a number of metal-composite laminate materials have been developed to replace the metals traditionally used in the construction of aircraft primary structures. The problems with these composite materials, however, include a mismatch between the strength to modulus of elasticity ratio of the different layers. This mismatch causes various layers of the composite to fail under a specific amount of stress before other layers of the composite, thereby underutilizing the strength on the non-failing layers. Thus, currently used low weight metal-composite laminate materials do not use the maximum strength of various layers for a given strain of the metal-composite laminate material.

Hence, there is a need for high strength, lightweight materials for use in industrial applications, such as for parts of motor and human powered vehicles, among other uses. Further, there is a need for lightweight, metal-composite laminate materials which utilize the strength of all layers of the material to the fullest extent per given strain of the metal-composite laminate material.

SUMMARY

According to one aspect of the present invention, there is provided a method of preparing a beta titanium-fiber reinforced composite laminate comprising the steps of, first providing a beta titanium alloy having a surface with an area and having a first yield strength to modulus of elasticity ratio. Then, the beta titanium alloy is heated at a first preselected temperature for a first preselected time to produce a beta titanium alloy having a second yield strength to modulus of elasticity ratio. Next, a fiber reinforced composite layer having a strength to modulus of elasticity ratio is adhered to the beta titanium alloy to produce a beta titanium-fiber reinforced composite laminate. The first preselected temperature and the first preselected time are preselected such that the second yield strength to modulus of elasticity ratio of the beta titanium alloy is substantially similar to the strength to modulus of elasticity ratio of the fiber reinforced composite.

In a preferred embodiment, the method additionally comprises a step of coating the surface of the beta titanium alloy with a noble metal such as platinum to produce a coated beta titanium alloy after the providing step. In another preferred embodiment, the method additionally comprises a step of abrading the surface of the beta titanium alloy to increase the area of the surface after the providing step. In another preferred embodiment, the method additionally comprises a step of priming the surface with a primer after the heating step. According to another aspect of the present invention, there is provided a beta titanium-fiber reinforced composite laminate produced according to the method.

According to still another aspect of the present invention, there is provided a beta titanium-fiber reinforced composite laminate comprising a first layer of beta titanium alloy having a surface and a first layer of fiber reinforced composite, wherein the first layer of beta titanium alloy has a yield strength to modulus of elasticity ratio that is substantially similar to the strength to modulus of elasticity ratio of the first layer of fiber reinforced composite. The surface of the beta titanium alloy can be coated with a noble metal such as platinum. The beta titanium-fiber reinforced composite laminate can also comprise a plurality of layers of beta titanium alloy, and, interspersed therebetween, at least one layer of fiber reinforced composite, wherein each layer of beta titanium alloy has a yield strength to modulus of elasticity ratio that is substantially similar to the strength to modulus of elasticity ratio of the at least one layer of the fiber reinforced composite.

According to still another aspect of the present invention, there is provided a method of making an article of manufacture comprising the steps of, first preparing a beta titanium-fiber reinforced composite laminate according to the present invention. Then, the beta titanium-fiber reinforced composite laminate is incorporated into the article of manufacture. Examples of such articles of manufacture include a motor vehicle, a golf club, a softball bat, a ski, a surf board, a snow board and a container.

According to still another aspect of the present invention, there is provided a method of preparing a metal-fiber reinforced composite laminate comprising the steps of, first, providing a metal having a surface with an area and having a first yield strength to modulus of elasticity ratio. Then, the metal is heated at a first preselected temperature for a first preselected time to produce a metal having a second yield strength to modulus of elasticity ratio. Next, a fiber reinforced composite having a strength to modulus of elasticity ratio is adhered to the metal to produce a metal-fiber reinforced composite laminate. The first preselected temperature and the first preselected time are preselected such that the second yield strength to modulus of elasticity ratio of the metal is substantially similar to the strength to modulus of elasticity ratio of the fiber reinforced composite, and the metal has a second yield strength to modulus of elasticity ratio that is greater than about 1%.

BRIEF DESCRIPTION OF THE DRAWINGS

These features, aspects and advantages of the present invention will become better understood with regard to the following description and appended claims in the accompanying figures (not necessarily drawn to scale) where:

DESCRIPTION

Figure 1:
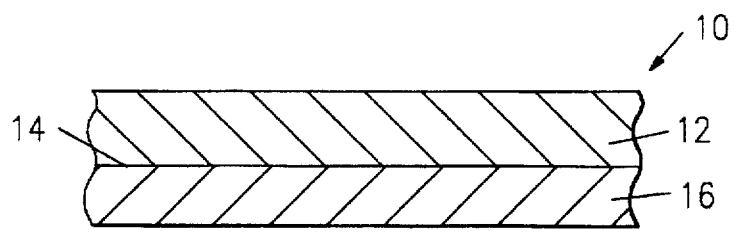
FIG. 1 is a side elevational view of a cross-section through a beta titanium-fiber reinforced composite laminate according to the present invention.

As disclosed herein, the present invention includes, among other embodiments, a beta titanium-fiber reinforced composite laminate, a method for making a beta titanium-fiber reinforced composite laminate, and structures comprising a beta titanium-fiber reinforced composite laminate. Beta titanium-fiber reinforced composite laminates according to the present invention and laminates made according to the present invention advantageously have high strength to weight ratios, excellent damage resistance, tend to be highly fatigue resistant and corrosion resistant and have excellent shock dampening characteristics, among other advantages as will be understood by those with skill in the art with reference to the disclosure herein.

The beta titanium-fiber reinforced composite laminate of the present invention comprises at least a first layer of a beta titanium alloy having a surface. The layer of beta titanium alloy can be at least one beta titanium alloy selected from the group consisting of TIMETAL® 15-3 (Ti 15V-3Cr-3Al-3Sn), BETA 21s® (Ti 15Mo-3Al-3Nb), BETA C® (Ti 3Al-8V-6Cr-4Zr-4Mo) and B120 VCA (Ti 13V-11Cr-3Al), though other beta titanium alloys can be used as will be understood by those with skill in the art with reference to the disclosure herein. In a preferred embodiment, the beta titanium alloy is TIMETAL® 15-3 (Ti 15V-3Cr-3Al-3Sn) (available from Titanium Metals Corporation, Toronto, Ohio).

The beta titanium-fiber reinforced composite laminate of the present invention further comprises at least one layer of a fiber reinforced composite. The fiber reinforced composite can be at least one fiber reinforced composite selected from the group consisting of graphite reinforced epoxies (such as HERCULES® IM7/8551-7 available from Hercules Advanced Materials and Systems Company, Magna, Utah), and S2-glass reinforced epoxies (such as 3M SP 381, available from 3M Aerospace Materials Department, St. Paul, Minn.), though other fiber reinforced composites can be used as will be understood by those with skill in the art with reference to the disclosure herein. In a preferred embodiment, the fiber reinforced composite is a graphite reinforced epoxy, Fiberite IM7/977-3 (epoxy prepreg tape) (available from Fiberite, Orange, Calif.).

The layer of beta titanium alloy is bonded to the layer of fiber reinforced composite, thereby producing a laminate structure. According to the present invention, the beta titanium alloy layer of the laminate has a yield strength to modulus of elasticity ratio that is substantially similar to the strength to modulus of elasticity ratio of the layer of fiber reinforced composite. This substantial matching of yield strength to modulus of elasticity ratio of the beta titanium alloy layer with the strength to modulus of elasticity ratio of the fiber reinforced composite layer produces a lightweight, strong and damage-resistant material suitable for a wide range of uses.

As used herein, "substantially similar" refers to within about 40% (forty percent). In preferred embodiments of the present invention, the yield strength to modulus of elasticity ratio of the beta titanium alloy layer is within about 33% (thirty-three percent) of the strength to modulus of elasticity ratio of the fiber reinforced composite layer. In a particularly preferred embodiment, the yield strength to modulus of elasticity ratio of the beta titanium alloy layer is within about 10% (ten percent) of the strength to modulus of elasticity ratio of the fiber reinforced composite layer. In a preferred embodiment, the design limitations of the fiber reinforced composite layer have a limit load that is less than the maximum design load, thus giving a usable strength to modulus ratio of about 1.2% that closely matches the yield strength to modulus of elasticity ratio of the beta titanium alloy layer.

Referring now to FIG. 1, there can be seen a side elevational view of a cross-section through a beta titanium-fiber reinforced composite laminate 10 according to the present invention, comprising a fiber reinforced composite layer 12 that is bonded directly to the surface 14 of the beta titanium alloy layer 16.

Figure 2:
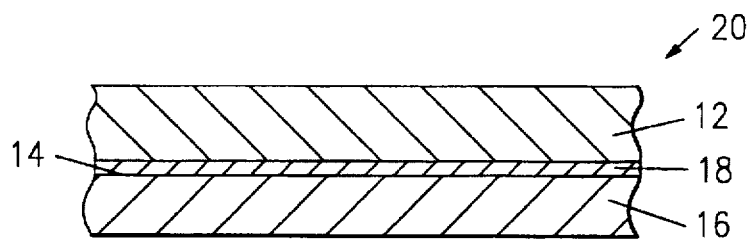
FIG. 2 is a side elevational view of a cross-section through a beta titanium-fiber reinforced composite laminate according to another embodiment of the present invention.

Referring now to FIG. 2, there can be seen a side elevational view of a cross-section through a beta titanium-fiber reinforced composite laminate 20 according to another embodiment of the present invention. While similar to the embodiment shown in FIG. 1, this preferred embodiment includes a layer of a noble metal 18 bonded to the surface 14 of the beta titanium alloy layer 16, thereby creating a noble metal layer 18 between the surface 14 of the beta titanium alloy layer 16 and the fiber reinforced composite layer 12. Suitable noble metals include at least one metal selected from the group consisting of gold, silver, and palladium, though other noble metals can also be suitable as will be understood by those with skill in the art with reference to the disclosure herein. In a particularly preferred embodiment, the noble metal is platinum (available from Metal Surfaces, Bell Gardens, Calif.).

Figure 3:
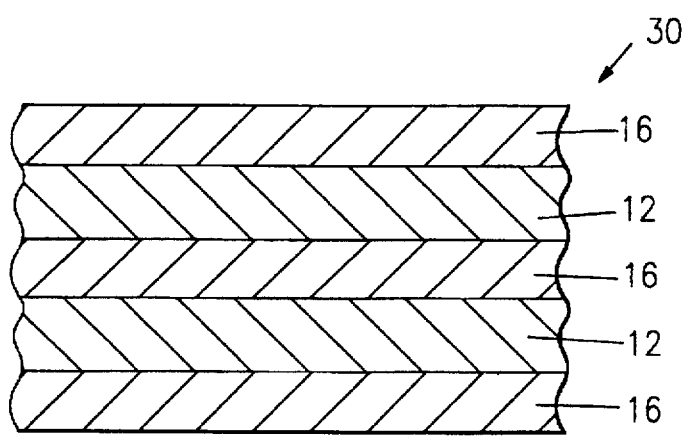
FIG. 3 is a side elevational view of a cross-section through a beta titanium-fiber reinforced composite laminate according to another embodiment of the present invention.

Referring now to FIG. 3, there can be seen a side elevational view of a cross-section through a beta titanium-fiber reinforced composite laminate 30 according to another embodiment of the present invention. In this preferred embodiment, the beta titanium-fiber reinforced composite laminate 30 comprises a plurality of layers of beta titanium alloy 16 and, interspersed therebetween, at least one fiber reinforced composite layer 12. The embodiment shown in FIG. 3 comprises two fiber reinforced composite layers interspersed between three beta titanium alloy layers. Each beta titanium alloy layer 16 has a yield strength to modulus of elasticity ratio that is substantially similar to the strength to modulus of elasticity ratio of the at least one fiber reinforced composite layer 12.

The beta titanium alloy layers 16 can be at least one beta titanium alloy selected from the group consisting of TIME- TAL® 15-3 (Ti 15V-3Cr-3Al-3Sn), BETA 21s® (Ti 15Mo-3Al-3Nb), BETA C® (Ti 3Al-8V-6Cr-4Zr-4Mo) and B120 VCA (Ti 13V-11Cr-3Al), though other beta titanium alloys can be used as will be understood by those with skill in the art with reference to the disclosure herein. In a preferred embodiment, the beta titanium alloy is TIMETAL® 15-3 (Ti 15V-3Cr-3Al-3Sn) (available from Titanium Metals Corporation, Toronto, Ohio). The plurality of layers of the beta titanium alloy 16 can comprise the same beta titanium alloy or can comprise different beta titanium alloys. For example, one layer of the plurality of layers of beta titanium alloy can comprise BETA 21s® while another layer of the plurality of beta titanium alloy layers can comprise TIME-TAL® 15-3.

The at least one layer of fiber reinforced composite 12 can be at least one fiber reinforced composite selected from the group consisting of graphite reinforced epoxies (such as HERCULES® IM7/8551-7 available from Hercules Advanced Materials and Systems Company, Magna, Utah), and S2-glass reinforced epoxies (such as 3M SP 381, available from 3M Aerospace Materials Department, St. Paul, Minn.), though other fiber reinforced composites can be used as will be understood by those with skill in the art with reference to the disclosure herein. In a preferred embodiment, the fiber reinforced composite is a graphite reinforced epoxy, Fiberite IM7/977-3 (epoxy prepreg tape) (available from Fiberite, Orange, Calif.).

When more than one layer of fiber reinforced composite is present, the plurality of fiber reinforced composite layers 12 can comprise the same fiber reinforced composite or can comprise different fiber reinforced composites. For example, one layer of the plurality of layers of fiber reinforced composite can comprise graphite reinforced epoxy while another layer of the plurality of fiber reinforced composite layers can comprise S2-glass reinforced epoxy.

Figure 4:
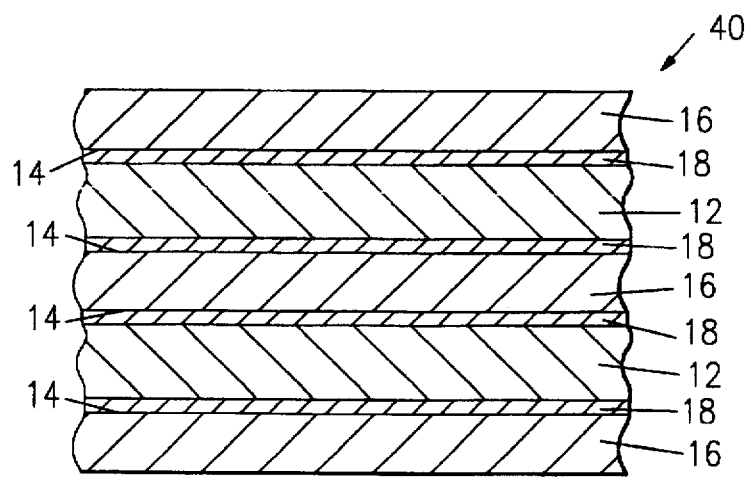
FIG. 4 is a side elevational view of a cross-section through a beta titanium-fiber reinforced composite laminate according to another embodiment of the present invention.

Referring now to FIG. 4, there can be seen a side elevational view of a cross-section through a beta titanium-fiber reinforced composite laminate 40 according to another embodiment of the present invention. While similar to the embodiment shown in FIG. 3, this preferred embodiment includes a layer of a noble metal 18 bonded to each surface 14 of each beta titanium alloy layer 16, thereby creating a noble metal layer 18 between each surface 14 of each beta titanium alloy layer 16 and each fiber reinforced composite layer 12. Suitable noble metals include at least one metal selected from the group consisting of gold, silver, and palladium, though other noble metals can also be suitable as will be understood by those with skill in the art with reference to the disclosure herein. In a particularly preferred embodiment, the noble metal is platinum (available from Metal Surfaces, Bell Gardens, Calif.).

Figure 5:
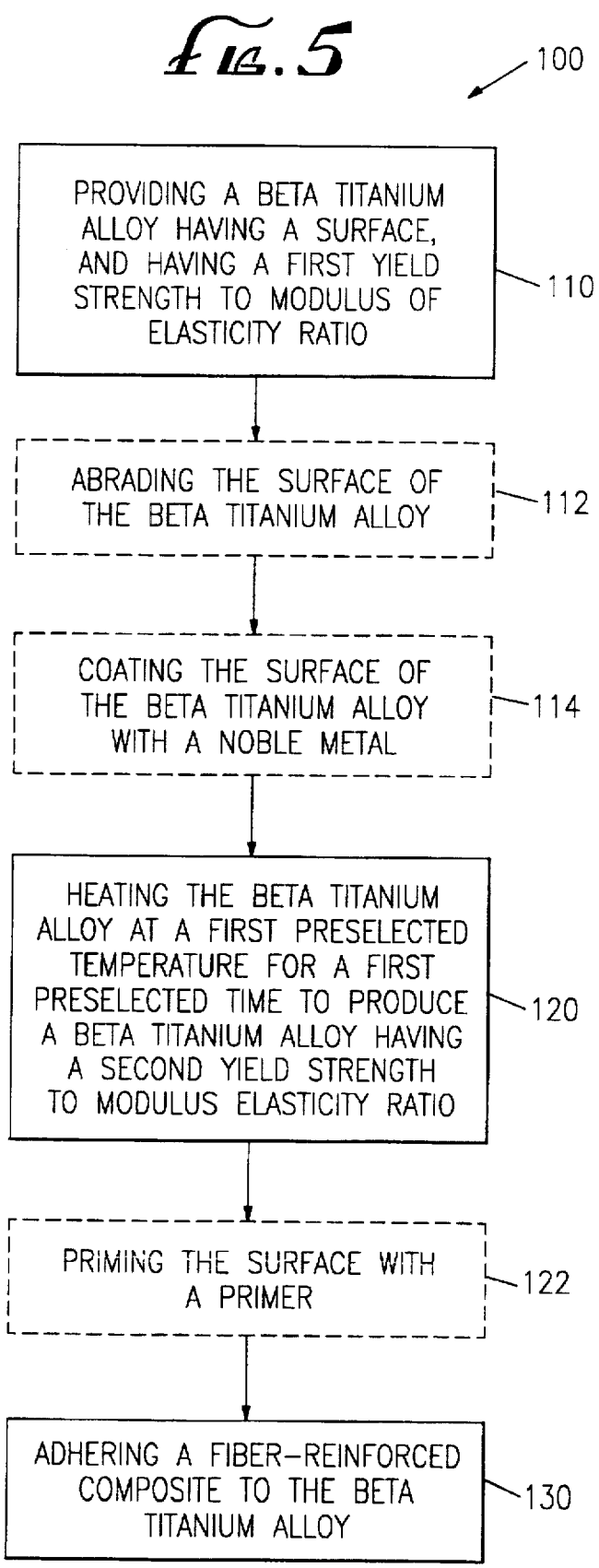
FIG. 5 is a flow diagram of one embodiment of the method according to the present invention.

According to another aspect of the present invention, there is provided a method of preparing a beta titanium-fiber reinforced composite laminate. FIG. 5 is a flow diagram of one embodiment of the method according to the present invention.

The method 100 comprises the step 110 of first providing a beta titanium alloy having a surface with an area and having a first yield strength to modulus of elasticity ratio. Next, the method comprises the step 120 of heating the beta titanium alloy at a first preselected temperature for a first preselected time to produce a beta titanium alloy having a second yield strength to modulus of elasticity ratio. Then, the method comprises the step 130 of adhering a fiber reinforced composite to the beta titanium alloy to produce a beta titanium-fiber reinforced composite laminate. The fiber reinforced composite has a strength to modulus of elasticity ratio. The first preselected temperature and the first preselected time are preselected such that the second yield strength to modulus of elasticity ratio of the beta titanium alloy is substantially similar to the strength to modulus of elasticity ratio of the fiber reinforced composite.

Suitable first preselected temperatures and suitable first preselected times can be determined by those with skill in the art with reference to the disclosure herein and will vary with the second yield strength to modulus of elasticity ratio desired. In a preferred embodiment, the first preselected temperature is between about 450° C. and about 700° C., and the first preselected time is between about eight hours and about sixteen hours. In a particularly preferred embodiment, the first preselected temperature is about 510° C., and the first preselected time is about eight hours.

In another preferred embodiment, the method of preparing a beta titanium-fiber reinforced composite laminate additionally comprises the step 112 of abrading the surface of the beta titanium alloy after the providing step, thereby increasing the surface area to allow greater bonding between the surface and a noble metal coating, or between the surface and an adhesive coating.

In another preferred embodiment, the method of preparing the beta titanium-fiber reinforced composite laminate additionally comprises the step 114 of coating the surface of the beta titanium alloy with a noble metal to produce a coated beta titanium alloy after the providing step. The noble metal can be selected from a group consisting of gold, silver, and palladium, though other noble metals can also be suitable as will be understood by those with skill in the art with reference to the disclosure herein. In a preferred embodiment, the noble metal is platinum.

Further, in another preferred embodiment, the method additionally comprises the step 122 of priming the surface with a primer after heating the beta titanium alloy. The primer can be selected from any suitable primer such as a low solid, high solvent epoxy glue, as will be understood by those with skill in the art with reference to the disclosure herein. In a preferred embodiment, the primer is EC 3917 (available from 3M Aerospace Materials Department, St. Paul, Minn.).

In a preferred embodiment, the adhering step 130 comprises applying an adhesive to the surface of the beta titanium alloy in order to bond the fiber reinforced composite layer to the beta titanium alloy layer. Suitable adhesives will be determined by the nature of the fiber reinforced composite. An example of a suitable adhesive is AF 191 (available from 3M Aerospace Materials Department, St. Paul, Minn.).

The adhering step 130 can also comprise heating the beta titanium alloy and the fiber reinforced composite at a second preselected temperature for a second preselected time in order to cure the laminate. Suitable second preselected temperatures and suitable second preselected times can be determined by those with skill in the art with reference to the disclosure herein. In a preferred embodiment, the second preselected temperature is between about 150° C. and 200° C., and the second preselected time is between about 45 minutes and 90 minutes. In a particularly preferred embodiment, the second preselected temperature is about 180° C. and the second preselected time is about 70 minutes.

Pressure can also be applied as part of the curing process to assist in creating the bond between the beta titanium alloy layer and the fiber reinforced composite layer. Suitable pressures can be determined by those with skill in the art with reference to the disclosure herein. In a preferred embodiment, the pressure is between about 30 and about 100 psi.

Suitable beta titanium alloys and suitable fiber reinforced composites for use in the methods according to the present invention include the materials disclosed herein for the beta titanium-fiber reinforced composite laminates according to the present invention.

According to another embodiment of the present invention, there is provided a method of making an article of manufacture or a part thereof. The method comprises preparing a beta titanium-fiber reinforced composite laminate according to the methods disclosed herein and incorporating the beta titanium-fiber reinforced composite laminate into an article of manufacture or part. Articles of manufacture or parts thereof suitable for preparation by this method include articles of manufacture in which lightweight, high strength materials are needed. Examples of parts of articles of manufacture include parts of motor and non-motor vehicles (like automobiles, planes, trains, bicycles, motorcycles, and spacecraft), such as I-beams, C-channels, hat section stiffeners, plates, facings for honeycomb sandwich panels, and tubes. Other suitable articles of manufacture include golf clubs (both the shaft and the head), tubular structures such as softball bats, skis, surf and snow boards, and cargo containers.

The present invention further includes an article of manufacture, or a part thereof, which comprises a beta titanium-fiber reinforced composite laminate according to the present invention or a beta titanium-fiber reinforced composite laminate prepared according to a method of the present invention. The article of manufacture or part thereof comprises a beta titanium-fiber reinforced composite laminate having a first beta titanium alloy layer having a surface and a first fiber reinforced composite layer, where the first beta titanium alloy layer has a yield strength to modulus of elasticity ratio which is substantially similar to the strength to modulus of elasticity ratio of the first fiber reinforced composite layer. The article of manufacture or part thereof can further comprise a second beta titanium alloy layer such that the first fiber reinforced composite layer is between the first beta titanium alloy layer and the second beta titanium alloy layer. The second beta titanium alloy layer has a yield strength to modulus of elasticity ratio that is substantially similar to the strength to modulus of elasticity ratio of the first fiber reinforced composite layer. The surface of the first beta titanium alloy layer can be coated with a noble metal such that the noble metal is between the surface of the beta titanium alloy and the first fiber reinforced composite layer. In a preferred embodiment, the noble metal is platinum.

Figure 6:
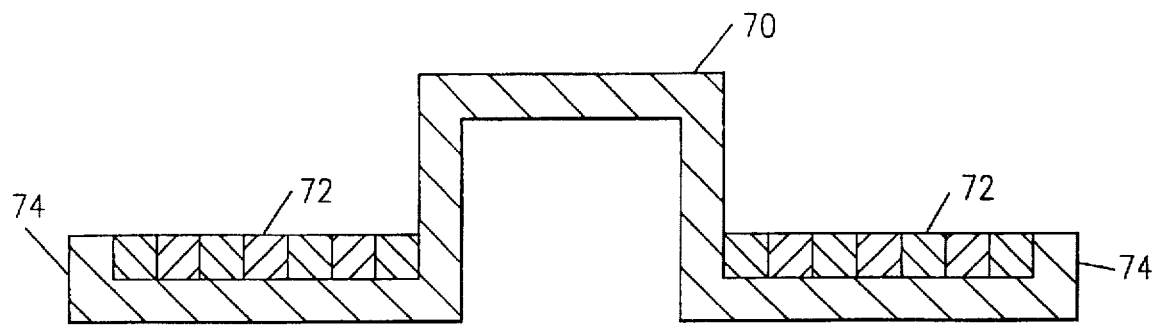
FIG. 6 is a side elevational view of a cross-section through a hat section stiffener with beta titanium-fiber reinforced composite laminates according to the present invention bonded to the flange sections.

FIG. 6 is a side elevational view of a cross-section through a hat section stiffener 70 as would be found in an aircraft with beta titanium-fiber reinforced composite laminates 72 according to the present invention bonded to the flange sections 74.

According to another aspect of the present invention, there is provided a method of preparing a metal-fiber reinforced composite laminate. The method comprises steps of first providing a metal having a surface with an area and having a first yield strength to modulus of elasticity ratio. Next, the metal is heated at a first preselected temperature for a first preselected time to produce a metal having a second yield strength to modulus of elasticity ratio. Then, a fiber reinforced composite having a strength to modulus of elasticity ratio is adhered to the metal to produce a metal-fiber reinforced composite laminate. The first preselected temperature and the first preselected time are preselected such that the second yield strength to modulus of elasticity ratio of the metal is substantially similar to the strength to modulus of elasticity ratio of the fiber reinforced composite. The metal has a second yield strength to modulus of elasticity ratio that is greater than about 1.2%. In a preferred embodiment, the metal has a second yield strength to modulus of elasticity ratio that is greater than about 1.0%.

EXAMPLE 1

METHOD FOR PREPARING A

BETA TITANIUM-FIBER REINFORCED COMPOSITE LAMINATE AND

BETA TITANIUM-FIBER REINFORCED COMPOSITE LAMINATE

PRODUCED ACCORDING TO THE METHOD

A beta titanium-fiber reinforced composite laminate according to the present invention was prepared by the method for preparing a beta titanium-fiber reinforced composite laminate according to the present invention as follows. First, a coil of 0.020 inch gauge TIMETAL® 15-3 (Ti 15V-3Cr-3Al-3Sn) (available from Titanium Metals Corporation, Toronto, Ohio) beta titanium alloy was provided. These beta titanium alloy sheets had a first yield strength to modulus of elasticity ratio of about 1.1%. Next, the coil was rolled to 0.010 inch gauge according to methods well known to those with skill in the art and cut into individual sheets of approximately 24 inches by 24 inches.

While not essential, at least one surface of each of the beta titanium alloy sheets was sandblasted to increase the surface area according to techniques well known to those with skill in the art. Next, a layer of platinum was applied to the sandblasted surfaces of the sheets through an electroless process according to techniques well known to those with skill in the art, creating platinum coated, beta titanium alloy sheets.

Then, the platinum coated, beta titanium alloy sheets were age-hardened by heating at a preselected temperature of 510° C. for a preselected time of eight hours in a vacuum chamber. This heating resulted in hardened, platinum coated, beta titanium alloy sheets having a second yield strength to modulus of elasticity ratio 1.2%. Besides changing the yield strength to modulus of elasticity ratio, the heating also caused the removal of titanium oxide from the surfaces of the sheets, thereby improving the adherence of the platinum to the surfaces.

While not essential, the hardened, platinum coated, beta titanium alloy sheets were primed by spraying EC 3917 (available from 3M Aerospace Materials Department, St. Paul, Minn.). The primed, hardened, platinum coated, beta titanium alloy sheets were allowed to air dry for about one hour and then cured for a predetermined time of about one hour at a predetermined temperature of about 120° C.

Fiber reinforced composite layers were then added to the primed, hardened, platinum coated, beta titanium alloy sheets to create beta titanium-fiber reinforced composite laminates according to the present invention. Each fiber reinforced composite layer contained six plies of IM7/977-3 (epoxy prepreg tape) (available from Fiberite, Orange, Calif.) having a thickness of approximately 0.0052 inches, for a total thickness of approximately 0.031 inches per layer. All of the IM/977-3 were applied along the length or along the direction intended to carry most of the load. Although not essential, a glue, AF 191 (available from 3M Aerospace Materials Department, St. Paul), was utilized to secure the IM7/977-3 to the titanium sheets. The laminates were then cured in a flat press at 100 psi and 180° C. for one hour and cooled to room temperature while maintaining 100 psi pressure. The total thickness of the beta titanium-fiber reinforced composite laminate, including two layers of beta titanium alloy, three layers of fiber reinforced composite and adhesive was about 0.10 inches.

Figure 7:
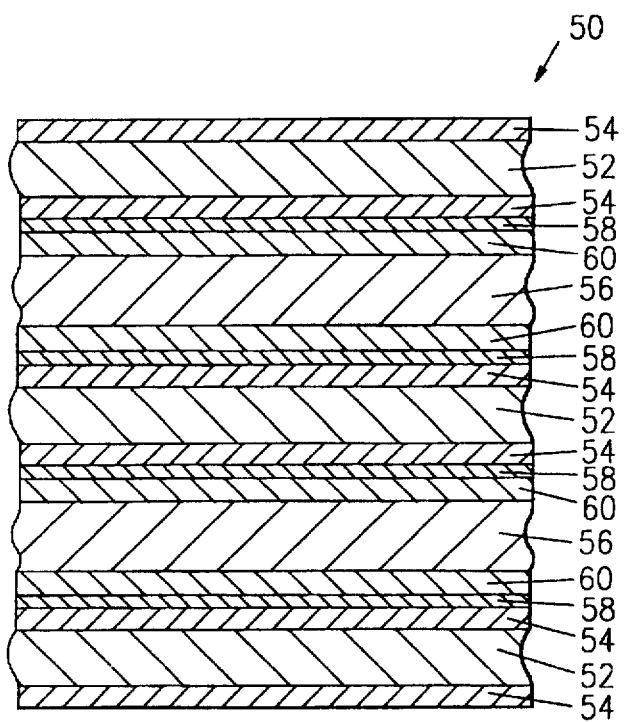
FIG. 7 is a side elevational view of a cross-section through a beta titanium-fiber reinforced composite laminate according to another embodiment of the present invention.

Referring now to FIG. 7, there is shown a side elevational view of a cross-section through the beta titanium-fiber reinforced composite laminate 50 produced according to this Example. As can be seen, the laminate 50 comprises three layers of beta titanium alloy 52, each layer having a platinum coating 54 thereon. Interspersed between the three layers of beta titanium alloy 52 are two layers 56 of carbon fiber prepreg tape, IM7/977-3, each layer comprising six plies of carbon fiber prepreg tape. Between each platinum coating 54 on the beta titanium alloy layers 52 and the IM7/977-3 layers 56 was a layer of EC 3917 primer 58 and a layer of AF 191 adhesive 60, as shown.

Although the present invention has been described in considerable detail with reference to certain preferred embodiments thereof, other embodiments are possible. For example, beta titanium-fiber reinforced composite laminates of the present invention can be utilized to construct sandwich panels which comprise beta titanium-fiber reinforced composite laminates according to the present invention on either side of a separating structure such as honeycomb (available from Advanced Honeycomb, San Marcos, Calif.). Therefore, the spirit and scope of the appended claims should not be limited to the description of the preferred embodiments contained herein.

I claim:

1. A method of preparing a beta titanium-fiber reinforced composite laminate comprising the steps of:
   (a) providing a beta titanium alloy having a surface with an area and having a first yield strength to modulus of elasticity ratio;
   (b) heating the beta titanium alloy at a first temperature for a first time to produce a beta titanium alloy having a second yield strength to modulus of elasticity ratio; and
   (c) adhering a fiber reinforced composite having a strength to modulus of elasticity ratio to the beta titanium alloy to produce a beta titanium-fiber reinforced composite laminate;
   wherein the first temperature and the first time are such that the second yield strength to modulus of elasticity ratio of the beta titanium alloy is substantially similar to the strength to modulus of elasticity ratio of the fiber reinforced composite.

2. The method of claim 1, additionally comprising a step of coating the surface of the beta titanium alloy with a noble metal to produce a coated beta titanium alloy after the providing step (a).

3. The method of claim 2, wherein the noble metal is platinum.

4. The method of claim 1, additionally comprising a step of abrading the surface of the beta titanium alloy to increase the area of the surface after the providing step (a).

5. The method of claim 1, additionally comprising a step of priming the surface with a primer after the heating step (b).

6. The method of claim 5, wherein the primer is a low solid, high solvent epoxy glue.

7. The method of claim 1, wherein the adhering step (c) comprises applying an adhesive to the surface of the beta titanium alloy.

8. The method of claim 1, wherein the adhering step (c) comprises heating the beta titanium alloy and the fiber reinforced composite at a second temperature for a second time.

9. The method of claim 1, wherein the beta titanium alloy provided in step (a) is selected from the group consisting of (Ti 15V-3Cr-3Al-3Sn), (Ti 15Mo-3Al-3Nb), (Ti 3Al-8V-6Cr-4Zr-4Mo) and (Ti 13V-11Cr-3Al).

10. The method of claim 1, wherein the fiber reinforced composite of step (c) is selected from the group consisting of graphite reinforced epoxies and S2-glass reinforced epoxies.

11. The method of claim 1, wherein the first temperature of step (b) is approximately 510° C. and the first time of step (b) is approximately 8 hours.

12. The method of claim 1, wherein the second yield strength to modulus of elasticity ratio of the beta titanium alloy produced by step (b) is within about 40% of the strength to modulus of elasticity ratio of the fiber reinforced composite of step (c).

13. The method of claim 1, wherein the second yield strength to modulus of elasticity ratio of the beta titanium alloy produced by step (b) is within about 10% of the strength to modulus of elasticity ratio of the fiber reinforced composite of step (c).

14. A method of making an article of manufacture, comprising the steps of:
   (i) preparing a beta titanium-fiber reinforced composite laminate according to the method of claim 1; and
   (ii) incorporating the beta titanium-fiber reinforced composite laminate into the article of manufacture.

15. The method of making an article of manufacture of claim 14, wherein the article of manufacture of step (ii) is selected from the group consisting of a motor vehicle, a golf club, a softball bat, a ski, a surf board, a snow board and a container.

16. The method of making an article of manufacture of claim 14, wherein the article of manufacture of step (ii) is a motor vehicle part.

17. A method of preparing a metal-fiber reinforced composite laminate comprising the steps of:
   (a) providing a metal having a surface with an area and having a first yield strength to modulus of elasticity ratio;
   (b) heating the metal at a first temperature for a first time to produce a metal having a second yield strength to modulus of elasticity ratio; and
   (c) adhering a fiber reinforced composite having a strength to modulus of elasticity ratio to the metal to produce a metal-fiber reinforced composite laminate;
   wherein the first temperature and the first time are such that the second yield strength to modulus of elasticity ratio of the metal is substantially similar to the strength to modulus of elasticity ratio of the fiber reinforced composite; and
   wherein the metal has a second yield strength to modulus of elasticity ratio that is greater than about 1.2%.

* * * * *